US011736761B2

(12) United States Patent
Sodagar

(10) Patent No.: US 11,736,761 B2
(45) Date of Patent: Aug. 22, 2023

(54) METHODS FOR MEDIA STREAMING CONTENT PREPARATION FOR AN APPLICATION PROVIDER IN 5G NETWORKS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/500,305

(22) Filed: Oct. 13, 2021

(65) Prior Publication Data

US 2022/0303616 A1  Sep. 22, 2022

Related U.S. Application Data

(60) Provisional application No. 63/161,837, filed on Mar. 16, 2021.

(51) Int. Cl.
*H04N 21/4363* (2011.01)
*H04N 21/61* (2011.01)
*H04N 21/6583* (2011.01)

(52) U.S. Cl.
CPC ... *H04N 21/43637* (2013.01); *H04N 21/6131* (2013.01); *H04N 21/6181* (2013.01); *H04N 21/6583* (2013.01)

(58) Field of Classification Search
CPC ......... H04N 21/43637; H04N 21/6131; H04N 21/6181; H04N 21/6583; H04L 65/1063; H04L 65/1069; H04L 65/612
See application file for complete search history.

(56) References Cited

U.S. PATENT DOCUMENTS

| 4,169,226 A | * | 9/1979 | Fukuji | ...................... H03J 9/06 |
| | | | | 398/106 |
| 4,804,972 A | * | 2/1989 | Schudel | .................. H01Q 1/42 |
| | | | | 343/915 |

(Continued)

OTHER PUBLICATIONS

International Search Report dated Jan. 24, 2022 from the International Searching Authority in International Application No. PCT/US2021/055046.

(Continued)

*Primary Examiner* — Michael B. Pierorazio
(74) *Attorney, Agent, or Firm* — Sughrue Mion, PLLC

(57) ABSTRACT

A method of directing content preparation for a 5G media streaming (5GMS) network performed by at least one processor implementing a 5GMS application provider, the method comprising creating a content preparation template, by the 5GMS application provider, wherein the content preparation template includes first information specifying instructions for content preparation, and second information specifying instructions for content output; establishing a first provisioning session with a 5GMS application function; transmitting the content preparation template to the 5GMS application function in the first provisioning session, wherein the 5GMS application function requests to allocate 5GMS content preparation resources and 5GMS content distribution resources; and receiving a first acknowledgement from the 5GMS application function, wherein the first acknowledgement indicates an allocation of at least one of content preparation resources and content distribution resources.

18 Claims, 11 Drawing Sheets

(56) References Cited

U.S. PATENT DOCUMENTS

| | | | | |
|---|---|---|---|---|
| 5,528,253 | A * | 6/1996 | Franklin | H01Q 1/427 343/872 |
| 6,023,242 | A * | 2/2000 | Dixon | H01Q 21/065 342/359 |
| 6,072,440 | A * | 6/2000 | Bowman | H01Q 1/42 343/872 |
| 6,538,612 | B1 * | 3/2003 | King | H01Q 1/125 343/765 |
| 6,832,070 | B1 * | 12/2004 | Perry | H04N 21/4782 348/E7.06 |
| 6,904,609 | B1 * | 6/2005 | Pietraszak | H04N 21/47 725/39 |
| 7,075,492 | B1 * | 7/2006 | Chen | H01Q 19/134 343/781 R |
| 7,076,202 | B1 * | 7/2006 | Billmaier | H04N 21/4334 455/66.1 |
| 7,239,274 | B2 * | 7/2007 | Lee | H01Q 1/3275 342/359 |
| 7,472,409 | B1 * | 12/2008 | Linton | H01Q 3/08 343/705 |
| 7,685,621 | B2 * | 3/2010 | Matsuo | H04N 21/4622 725/38 |
| 8,368,611 | B2 * | 2/2013 | King | H01Q 3/08 725/63 |
| 2002/0099695 | A1 | 7/2002 | Abajian et al. | |
| 2003/0051246 | A1 * | 3/2003 | Wilder | H04N 7/17318 348/E7.071 |
| 2003/0214449 | A1 * | 11/2003 | King | H01Q 3/08 343/765 |
| 2004/0128689 | A1 * | 7/2004 | Pugel | H04N 5/50 725/39 |
| 2004/0227655 | A1 * | 11/2004 | King | H01Q 1/3275 341/176 |
| 2005/0108751 | A1 * | 5/2005 | Dacosta | H04N 21/4135 348/E5.103 |
| 2005/0193415 | A1 * | 9/2005 | Ikeda | H04N 21/4586 725/50 |
| 2005/0225495 | A1 * | 10/2005 | King | H01Q 19/132 343/840 |
| 2006/0020978 | A1 * | 1/2006 | Miyagawa | H04B 17/27 725/72 |
| 2006/0139499 | A1 * | 6/2006 | Onomatsu | H04N 21/485 348/731 |
| 2006/0187117 | A1 * | 8/2006 | Lee | H01Q 1/1257 342/359 |
| 2007/0121651 | A1 | 5/2007 | Casey et al. | |
| 2007/0152897 | A1 * | 7/2007 | Zimmerman | H01Q 1/28 343/757 |
| 2007/0288588 | A1 | 12/2007 | Wein et al. | |
| 2008/0129885 | A1 * | 6/2008 | Yi | H04N 21/4263 348/731 |
| 2008/0186242 | A1 * | 8/2008 | Shuster | H01Q 19/17 343/762 |
| 2008/0186409 | A1 * | 8/2008 | Kang | H04N 21/426 348/731 |
| 2009/0135309 | A1 * | 5/2009 | DeGeorge | H04N 21/4345 348/732 |
| 2009/0260038 | A1 * | 10/2009 | Acton | H04N 21/482 725/49 |
| 2009/0310030 | A1 * | 12/2009 | Litwin | H04N 21/4345 348/731 |
| 2010/0214482 | A1 * | 8/2010 | Kang | H04N 5/50 348/731 |
| 2010/0235858 | A1 * | 9/2010 | Muehlbach | H04N 21/4383 725/37 |
| 2010/0315307 | A1 * | 12/2010 | Syed | H01Q 17/00 343/872 |
| 2011/0107379 | A1 | 5/2011 | Lajoie et al. | |
| 2011/0126232 | A1 * | 5/2011 | Lee | H04N 21/6405 707/E17.049 |
| 2013/0207868 | A1 * | 8/2013 | Venghaus | H01Q 19/12 343/840 |
| 2015/0161236 | A1 * | 6/2015 | Beaumont | G06F 16/48 707/736 |
| 2015/0161249 | A1 * | 6/2015 | Knox | G06F 16/337 707/737 |
| 2015/0382217 | A1 * | 12/2015 | Odio Vivi | H04B 17/336 370/252 |
| 2016/0173945 | A1 * | 6/2016 | Oh | H04N 21/2362 725/110 |
| 2016/0255394 | A1 * | 9/2016 | Yang | H04N 21/4348 725/131 |
| 2017/0064528 | A1 * | 3/2017 | Daly | H04W 4/02 |
| 2017/0295409 | A1 | 10/2017 | Simon et al. | |
| 2017/0317408 | A1 * | 11/2017 | Hamada | B62D 25/06 |
| 2018/0120169 | A1 * | 5/2018 | Jackson | G06Q 10/00 |
| 2018/0359541 | A1 * | 12/2018 | Park | G06F 9/54 |
| 2018/0359795 | A1 * | 12/2018 | Baek | H04W 76/15 |
| 2019/0037418 | A1 * | 1/2019 | Gunasekara | H04W 24/02 |
| 2019/0079659 | A1 * | 3/2019 | Adenwala | G06F 3/04842 |
| 2019/0335221 | A1 * | 10/2019 | Walker | H04L 67/04 |
| 2020/0107250 | A1 * | 4/2020 | So | H04W 48/18 |
| 2020/0297955 | A1 * | 9/2020 | Shouldice | G16H 40/63 |
| 2020/0305003 | A1 * | 9/2020 | Landa | H04W 4/40 |
| 2020/0374721 | A1 * | 11/2020 | Kumar | H04W 24/06 |
| 2021/0075678 | A1 * | 3/2021 | Seetharaman | H04W 28/0268 |
| 2021/0105308 | A1 * | 4/2021 | Bouazizi | H04N 21/8456 |
| 2022/0256451 | A1 * | 8/2022 | Ianev | H04W 48/18 |

OTHER PUBLICATIONS

Written Opinion dated Jan. 24, 2022 from the International Searching Authority in International Application No. PCT/US2021/055046.

"3rd Generation Partnership Project; Technical Specification Group Services and System Aspects; 5G Media Streaming (5GMS); Protocols (Release 16)", 3GPP TS 26.512 V16.1.0 (Dec. 2020), 96 pages.

"3rd Generation Partnership Project; Technical Specification Group Services and System Aspects; 5G Media Streaming (5GMS); General description and architecture (Release 16)", 3GPP TS 26.501 V16.6.1 (Jan. 2021), 79 pages.

Extended European Search Report dated Apr. 28, 2023 in Application No. 21931913.4.

Communication dated May 16, 2023 from the European Patent Office in App. No. 21931913.4.

Qualcomm Incorporated et al., "[FS_5GMS-EXT] Key Topic Content Preparation", 3GPP TSG SA WG4 #112e E-meeting, Feb. 1-10, 2021, S4-210306, (6 total pages).

* cited by examiner

METHODS FOR MEDIA STREAMING CONTENT PREPARATION FOR AN APPLICATION PROVIDER IN 5G NETWORKS

CROSS-REFERENCE TO RELATED APPLICATION

The present application claims priority to U.S. Provisional Application U.S. 63/161,837, filed on Mar. 16, 2021, in the United States Patent and Trademark Office, the contents of which are hereby expressly incorporated by reference, in their entirety, into the present application.

FIELD

The present disclosure relates generally to media processing and streaming methods and systems, more particularly to content preparation in 5G networks.

BACKGROUND

3rd Generation Partnership Project (3GPP) TS26.501 defines the general architecture for uplink and downlink streaming workflow. Further, 3GPP TS26.512 defines the concept of a content preparation template. However, neither the TS26.501 nor the TS26.512 define the characteristics of the content preparation template. Further, TS26.512 also does not define or describe the process of using the content preparation for content preparation, specifically, how to use a content preparation template for just-in-time content preparation.

SUMMARY

The present disclosure addresses one or more technical problems. The present disclosure provides technical solutions that enable Application Providers to direct the definition, process, and preparation of content preparation using content preparation templates. Embodiments of the present disclosure provide methods and workflows for content preparation including collaboration scenarios for content preparation for uplink and downlink streaming.

While TS26.512 defines the concepts of content preparation templates, the present disclosure describes collaboration scenarios for content preparation for uplink and downlink streaming including defining roles in the content preparation process and instantiating the content preparation process in 5GMS networks. Embodiments of the present disclosure also define how to use the content preparation template in a plurality of use cases enabling just-in-time content preparation over a 5G network. Just-in-time content preparation increases efficiency and reduces the computational overhead of the 5G network and the devices therein.

Embodiments of the present disclosure include methods and apparatus for directing content preparation for a 5G media streaming (5GMS) network performed by at least one processor implementing an application provider. The method includes creating a content preparation template, by the 5GMS application provider, wherein the content preparation template includes first information specifying instructions for content preparation, and second information specifying instructions for content output; establishing a first provisioning session with a 5GMS application function; transmitting the content preparation template to the 5GMS application function in the first provisioning session, wherein the 5GMS application function requests to allocate 5GMS content preparation resources and 5GMS content distribution resources; and receiving a first acknowledgement from the 5GMS application function, wherein the first acknowledgement indicates an allocation of at least one of content preparation resources and content distribution resources.

According to embodiments, the method includes transmitting content to a 5GMS application server, wherein the transmitting of the content is done prior to downlink streaming of the content to one or more user devices, and wherein the transmitting of the content to the 5GMS application server is subsequent to establishing the first provisioning session According to embodiments, the 5GMS application server is configured to partially modify the content based on the content preparation template, and wherein the 5GMS application server is configured to distribute the partially modified content to the one or more user devices.

According to embodiments, the method includes receiving partially modified content from a 5GMS application server, wherein the partially modified content is received after uplink streaming of content from one or more user devices.

According to embodiments, the 5GMS application server is configured to partially modify the content from the one or more user devices based on the content preparation template, and wherein the 5GMS application server is configured to receive the content to be partially modified from the one or more user devices.

According to embodiments, the application function comprises a first application function, and wherein the method includes establishing a second provisioning session with a second 5GMS application function; defining a resource request, wherein the resource request is based on the allocation of the at least one of the 5GMS content preparation resources and the 5GMS content distribution resources; transmitting the resource request to the second 5GMS application function in the second provisioning session, wherein the second 5GMS application function requests to allocate 5GMS content preparation resources and 5GMS content distribution resources; and receiving a second acknowledgement from the second 5GMS application function, wherein the second acknowledgement indicates the allocation of the 5GMS content preparation resources and the 5GMS content distribution resources based on the resource request.

According to embodiments, the 5GMS application function is a first 5GMS application function, and wherein the first acknowledgement further comprises information indicating at least one of an uplink session or a downlink session with a second 5GMS application function.

According to embodiments, the transmitting of the content preparation template to the application function causes an instantiation of a content preparation and resource allocation process at a 5GMS application server.

According to embodiments, the 5GMS application function comprises a first 5GMS application function, and wherein prior to the receiving of the first acknowledgement, the first 5GMS application function is configured to establish a second provisioning session with a second 5GMS application function.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
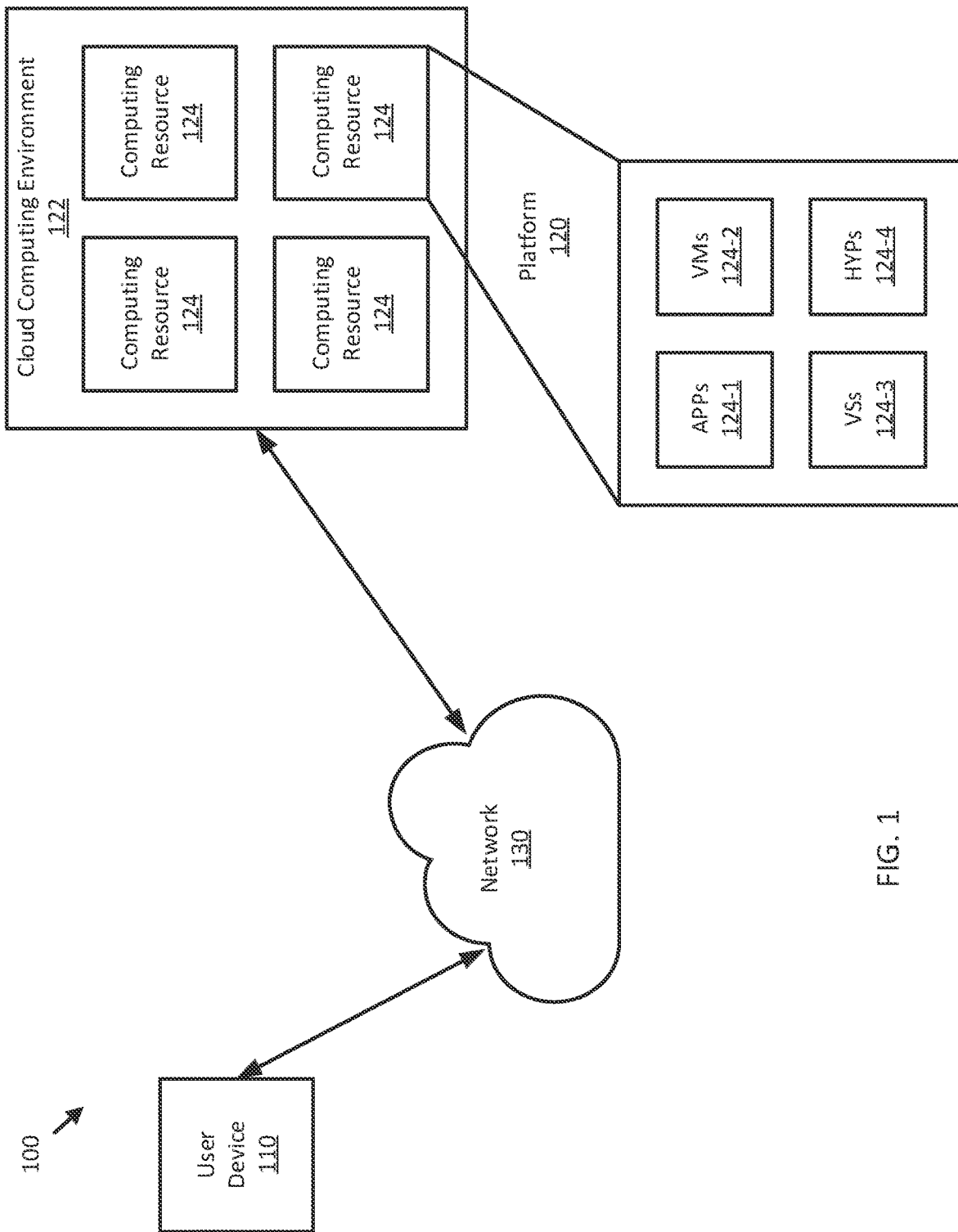
FIG. 1 is a diagram of an environment in which methods, apparatuses, and systems described herein may be implemented, according to embodiments.

The proposed features discussed below may be used separately or combined in any order. Further, the embodiments may be implemented by processing circuitry (e.g., one or more processors or one or more integrated circuits) or processing entities (e.g., one or more application providers, one or more application servers, or one or more application functions). In one example, the one or more processors execute a program that is stored in a non-transitory computer-readable medium.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (M1d) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
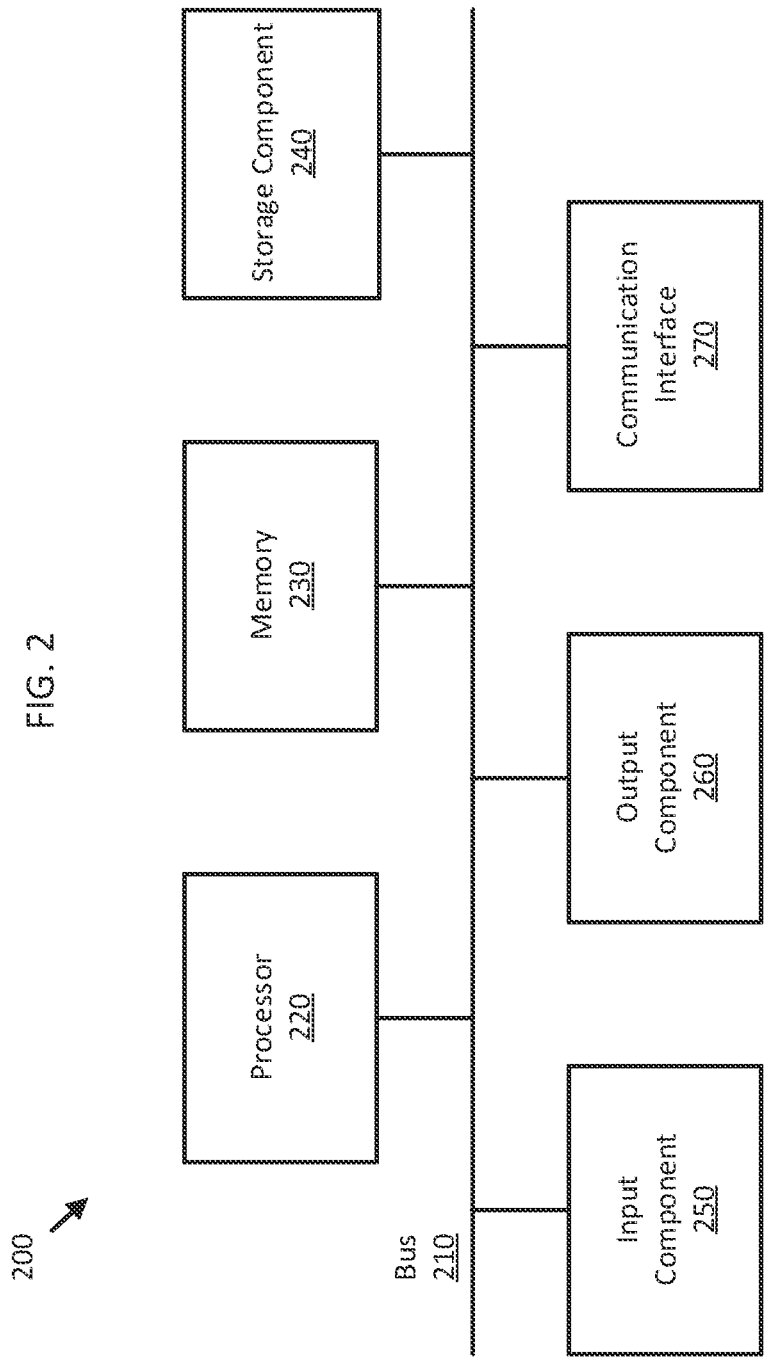
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
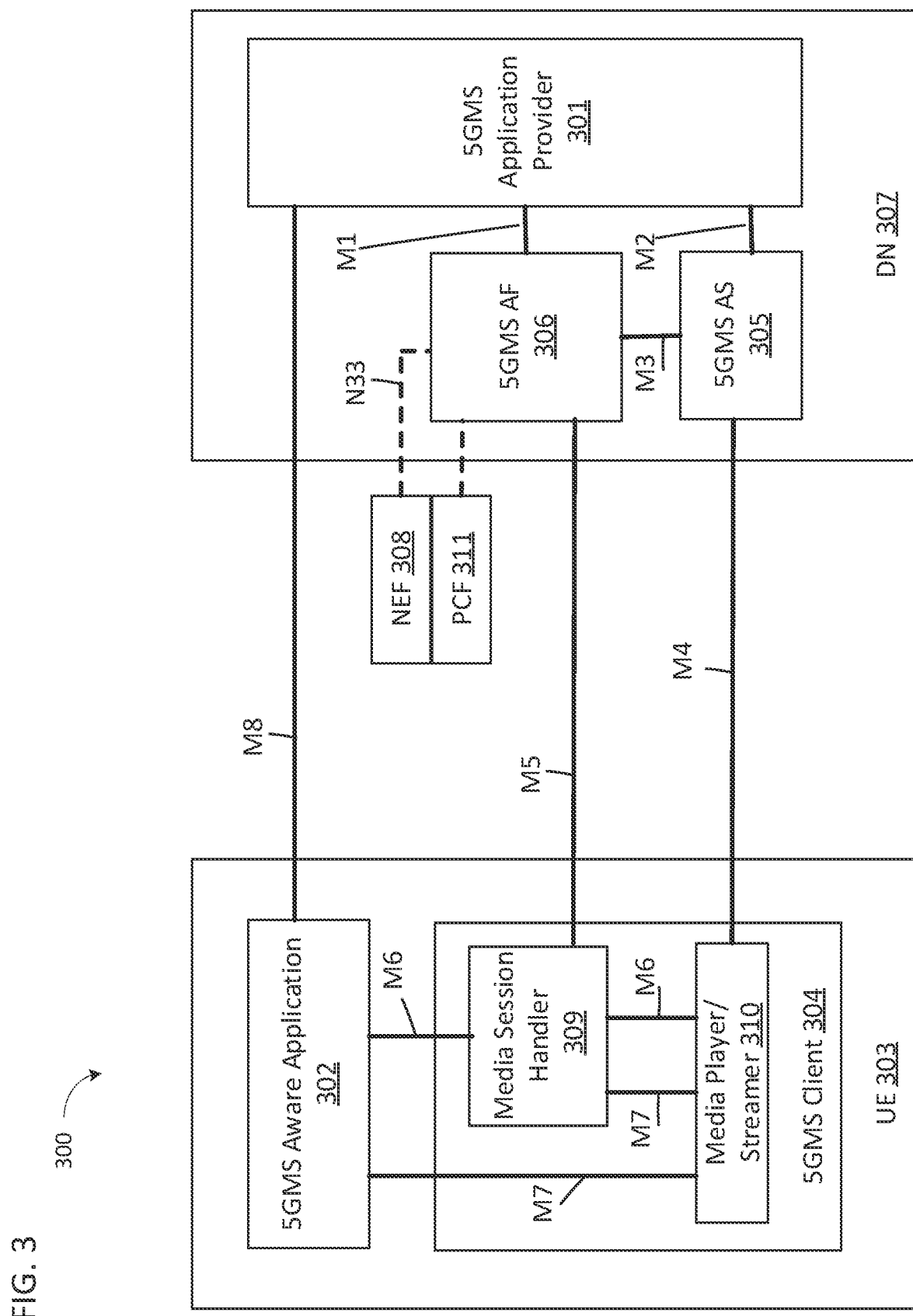
FIG. 3 is a block diagram of a network architecture for media streaming, according to embodiments.

FIG. 3 is a diagram of a media architecture 300 for media streaming. In embodiments, media architecture 300 may be used for processing media content after Uplink streaming or before Downlink streaming. A 5G media streaming uplink (5GMS) Application Provider 301 may use 5GMS for streaming services. 5GMS Application provider 301 may provide a 5GMS Aware Application 302 on the UE 303 to make use of 5GMS Client 304 and network functions using interfaces and APIs defined in 5GMS. 5GMS Application Server (AS) may be an Application Server dedicated to 5G Media Streaming. 5GMS Client 304 may be a UE 303 internal function dedicated to 5G Media Streaming.

5GMS Application Function 306 and 5GMS Application Server 305 may be Data Network (DN) 307 functions. Functions in trusted Data Networks may be trusted by the operator's network. Therefore, Application Functions in trusted Data Networks may directly communicate with all 5G Core functions. Functions in external Data Networks may only communicate with 5G Core functions via the Network Exposure Function (NEF) 308 using link 320.

The media architecture 300 may connect UE 303 internal functions and related network functions for 5G Media Uplink Streaming. In some embodiments, the media architecture 300 may connect UE 303 internal functions and related network functions for 5G Media Downlink Streaming. Accordingly, media architecture 300 may include a number of functions. For example, 5GMS Client 304 on UE 303 may be an originator of 5GMS service that may be accessed through interfaces/APIs. 5GMS Client 304 may include two sub-functions, media session handler (MSH) 309 and media streamer 310. MSH 309 may communicate with the 5GMS Application Function 306 in order to establish, control and support the delivery of a media session. The MSH 309 may expose APIs that can be used by the 5GMS Aware Application 302. Media Streamer 310 may communicate with 5GMS Application Server 305 in order to stream the media content and provide a service to the 5GMS Aware Application 302 for media capturing and streaming, and the MSH 309 for media session control. 5GMS Aware Application 302 may control 5GMS Client 303 by implementing external application or content service provider specific logic and enabling the establishment of a media session. 5GMS Application Server 305 may host 5G media functions. 5GMS Application Provider 301 may be an external application or content specific media functionality, e.g., media storage, consumption, transcoding and redistribution that uses 5GMS to stream media from 5GMS Aware Application 302. 5GMS Application Function 306 may provide various control functions to the MSH 309 on the UE 303 and/or to 5GMS Application Provider 301. 5GMS Application Function 306 may relay or initiate a request for different Policy or Charging Function (PCF) 311 treatment or interact with other network functions.

Media architecture 300 may include a number of different interfaces. For example, link M1 may be a 5GMS Provisioning API exposed by 5GMS Application Function 306 to provision usage of media architecture 300 and to obtain feedback. Link M2 may be a 5GMS Publish API exposed by 5GMS Application Server 305 and used when 5GMS Application Server 305 in trusted Data Network, such as Data Network 307, is selected to receive content for streaming service. Link M3 may be an internal API used to exchange information for content hosting on 5GMS Application Server 305 within a trusted Data Network such as Data Network 307. Link M4 may be a Media Uplink Streaming API exposed by 5GMS Application Server 323 to Media Streamer 310 to stream media content. Link M5 may be a Media Session Handling API exposed by 5GMS Application Function 305 to Media Session Handler for media session handling, control and assistance that also include appropriate security mechanisms e.g. authorization and authentication. Link M6 may be a UE 303 Media Session Handling API exposed by MSH 309 to 5GMS Aware Application 302 to make use of 5GMS functions. Link M7 may be a UE Media Streamer API exposed by Media Streamer 310 to 5GMS Aware Application 302 and MSH 309 to make use of Media Streamer 310. Link M8 may be an Application API which is used for information exchange between 5GMS Aware Application 302 and 5GMS Application Provider 301, for example to provide service access information to the 5GMS Aware Application 302.

Embodiments corresponding to FIGS. 4-5 & 7-10B relate to workflows, collaboration schemes, and procedures directed to process media content across a 5G network by a 5GMS Application Provider.

In some embodiments, the 5GMS Application Provider may direct content processing across the 5G network by defining the content preparation process. As an example, the 5GMS Application Provider may direct content processing across the 5G network by defining content preparation templates and providing the content preparation templates to 5GMS Application Functions or 5GMS Application Servers across the 5G network using network functions and APIs. Content Preparation Templates (CPT) may include information and instructions for content preparation. In some embodiments, content preparation templates include information and instructions related to output formats for media content. In some embodiments, content preparation templates may include information that may be used for allocation of content preparation resources or content distribution resources across the 5GMS network.

In some embodiments, the 5GMS Application Provider may direct the content preparation process for its media stream before distributing the media stream to a UE by defining content preparation templates and providing the content preparation templates. In some embodiments, the 5GMS Application Provider may direct the content preparation process for a media stream from a 5GMS Aware Application before receiving the media stream by defining content preparation templates and providing the content preparation templates. In some embodiments, the 5GMS Application Provider may direct the content preparation process for a media stream by defining content preparation templates and providing the content preparation templates to one or more 5GMS Application Functions in preparation for an uplink media stream from one or more UEs and before downlink streaming to one or more UEs. As an example, a 5GMS Application Provider may define content preparation templates and provide the content preparation templates to a first 5GMS Application Function, enabling the first 5GMS Application Function to communicate with a second 5GMS Application Function. The first 5GMS Application Function and second 5GMS Application Function can communicate and process media content from a media stream after the media stream is uploaded from a 5GMS Aware Application and before the media content is downloaded to another 5GMS Aware Application.

In some embodiments, a 5GMS Application Provider may establish a provisioning session with one or more 5GMS Application Functions. In some embodiments, 5GMS Application Provider may transmit content preparation templates to one or more 5GMS Application Functions during the provisioning session. In some embodiments, the 5GMS Application Provider may establish a provisioning session with a 5GMS Application Function and then define and transmit content preparation templates. In some embodiments, 5GMS Application Provider may establish more than one provisioning session with more than one 5GMS Application Functions. In some embodiments, the 5GMS Application Provider may establish a provisioning session with a first 5GMS Application Function and the first 5GMS Application Function may be configured to establish another provisioning session with a second 5GMS Application Function.

In some embodiments, a 5GMS Application Provider may receive an acknowledgement from a 5GMS Application Function after establishing a provisioning session with the 5GMS Application Function. The acknowledgment may include information relating to discovery of resources, allocation of content preparation resources, allocation of content distribution resources, an uplink session with one or more other 5GMS Application Functions, or a downlink session with one or more other 5GMS Application Functions. In some embodiments, a 5GMS Application Server may determine information relating to discovery of resources, allocation of content preparation resources, allocation of content distribution resources and transmit it to the 5GMS Application Function.

In some embodiments, a 5GMS Application Provider may transmit media content to a 5GMS Application Server, wherein the media content may be modified based on the content preparation template. As an example, in some embodiments, the media content to be transmitted may be partially or completely modified prior to the downlink streaming of the modified media content to one or more user devices, the 5GMS Application Provider may transmit media content to be partially modified to the 5GMS Application Server. In some embodiments, the 5GMS Application Provider may transform the media content or partially modify the media content based on the content preparation template and distribute the partially modified media content to the one or more requesting client devices.

In some embodiments, a 5GMS Application Provider may receive partially modified media content from a 5GMS Application Server, wherein the media content may be modified based on the content preparation template. As an example, in some embodiments, the partially or completely modified media content may be received by the 5GMS Application Provider after the uplink streaming of the media content from one or more user devices to a 5GMS Application Server. The 5GMS Application Server may partially or completely modify the media content received from the one or more user devices based on the content preparation template and transmit the partially or completely modified media content to the 5GMS Application Provider that requested the partially or completely modified media content.

In some embodiments, a 5GMS Application Provider may direct the transfer of media content from a first 5GMS Application Server to another 5GMS Application Server through information in or accompanying the content preparation template. The 5GMS Application Provider may direct the transfer of media content from a first 5GMS Application Server to another 5GMS Application Server through information in or accompanying the content preparation template using one or more 5GMS Application Functions, wherein either the first 5GMS Application Server or the second 5GMS Application Server may be directed to modify the media content based on the content preparation template.

In some embodiments, a 5GMS Application Provider may updated the content preparation templates and transmit the updated content preparation template to one or more 5GMS Application Functions. The 5GMS Application Provider may receive an updated acknowledgement from the 5GMS Application Function, wherein the acknowledgement may indicate an updated information relating to discovery of resources, allocation of content preparation resources, allocation of content distribution resources, an uplink session with one or more other 5GMS Application Functions, or a downlink session with one or more other 5GMS Application Functions.

In some embodiments, the 5GMS Application Provider may create a content hosting configuration template (HCT) and transmit the content hosting configuration template to the 5GMS Application Function in the provisioning session with the 5GMS Application provider. The content hosting configuration template may include instructions and information for third-party providers to optimize delivery of media content over the 5G network. In some embodiments, 5GMS Application Server may allocate content preparation resources and allocate content distribution resources based on the content hosting configuration template.

In some embodiments, the 5GMS Application Provider may announce availability of content preparation services based on the acknowledgement from the provisioning session. The availability of content preparation services may be determined based on the allocation of content preparation resources, allocation of content distribution resources, and discovery of resources generally across the 5G network. In some embodiments, the 5GMS Application Provider may broadcast the availability of content preparation services to one or more 5GMS Aware Applications on the 5G network. In some embodiments, the 5GMS Application Provider may broadcast the availability of content preparation services to one or more 5GMS devices in the 5G network.

In some embodiments, the 5GMS Application Provider may establish a second provisioning session with another 5GMS Application Function. The second provision session may include a resource request, the resource request being based on the allocation of content preparation resources and content distribution resources. The 5GMS Application Provider may transmit the resource request to the second 5GMS Application Function, and receive a second acknowledgement indicating the allocation of the content preparation and distribution resources based on the resource request.

As an example, if a 5GMS Application Provider defines content preparation between a downlink media stream and an uplink media stream, the 5GMS Application Provider may establish a first provisioning session with a first 5GMS Application Function and a second provisioning session with a second 5GMS Application Function. The first provisioning session may include the 5GMS Application Provider to define content preparation templates for the media stream being uplinked. The second provisioning session may include defining resource request based on information relating to allocation of content preparation resources or the content distribution resources received from the first acknowledgement. The 5GMS Application Provider may transmit information relating to allocation of content preparation resources or the content distribution resources received from the first acknowledgement to the second 5GMS Application Function. The 5GMS Application Provider may receive a second acknowledgement from the second 5GMS Application Server, with the second acknowledgement indicating the allocation of content preparation and distribution resources based on the resource request.

In some embodiments, the 5GMS Application Provider may establish the first provisioning session with a first 5GMS Application Function and the first 5GMS Application Function may establish a provisioning session with a second 5GMS Application Function. As an example, the 5GMS Application Provider may establish a provisioning session with an Uplink 5GMS Application Function. The Uplink 5GMS Application Function may establish a provisioning session with a Downlink 5GMS Application Function. The two 5GMS Application Functions may communicate with each other and their respective 5GMS Application Servers to discover resources, allocate content preparation resources, and allocate content distribution resources. As another example, the 5GMS Application Provider may establish a provisioning session with an Downlink 5GMS Application Function. The Downlink 5GMS Application Function may establish a provisioning session with a Uplink 5GMS Application Function. The two 5GMS Application Functions may communicate with each other and their respective 5GMS Application Servers to discover resources, allocate content preparation resources, and allocate content distribution resources. In some embodiments, the respective 5GMS Application Servers may communicate with each other through APIs and transfer media content that may be modified using the content preparation templates.

In some embodiments, 5GMS Application Servers may discover resources for content processing. The 5GMS Application Server and 5GMS Application Function may communicate about discovering resources and allocating resources based on the content preparation template. The content preparation template transmitted by the 5GMS Application Provider may have a cascading effect causing an instantiation of a content preparation and content resource allocation at the 5GMS Application Server when the 5GMS Application Function requests resources and media content as defined by the 5GMS Application Provider in the content preparation templates.

In some embodiments, processing a media stream may include one or more 5GMS Application Servers processing the content based on the content preparation template. In some embodiments, the 5GMS Application Servers may receive media content from a 5GMS Application Provider and may partially modify the media content based on the content preparation template. In some embodiments, the 5GMS Application Servers may receive partially modified media content from a 5GMS Application Provider wherein the media content is partially modified based on the content preparation template. In some embodiments, the 5GMS Application Servers may transmit media content or media stream received from a 5GMS Aware Application or 5GMS client to the 5GMS Application Provider, wherein that media content may be partially modified based on the content preparation template by components of the 5GMS network. In some embodiments, the 5GMS Application Servers may transmit media content or media stream received from a 5GMS Aware Application or 5GMS client to another 5GMS Application Server and may partially modify the media content based on the content preparation template. As an example, a first 5GMS Application Server may process the media content received from a UE or 5GMS Aware Application based on content preparation templates before sending the processed media content to a second 5GMS Application Server. As another example, a first 5GMS Application Server may send the media content received from a UE or 5GMS Aware Application to a second 5GMS Application Server which may process the media content based on content preparation templates.

Figure 4:
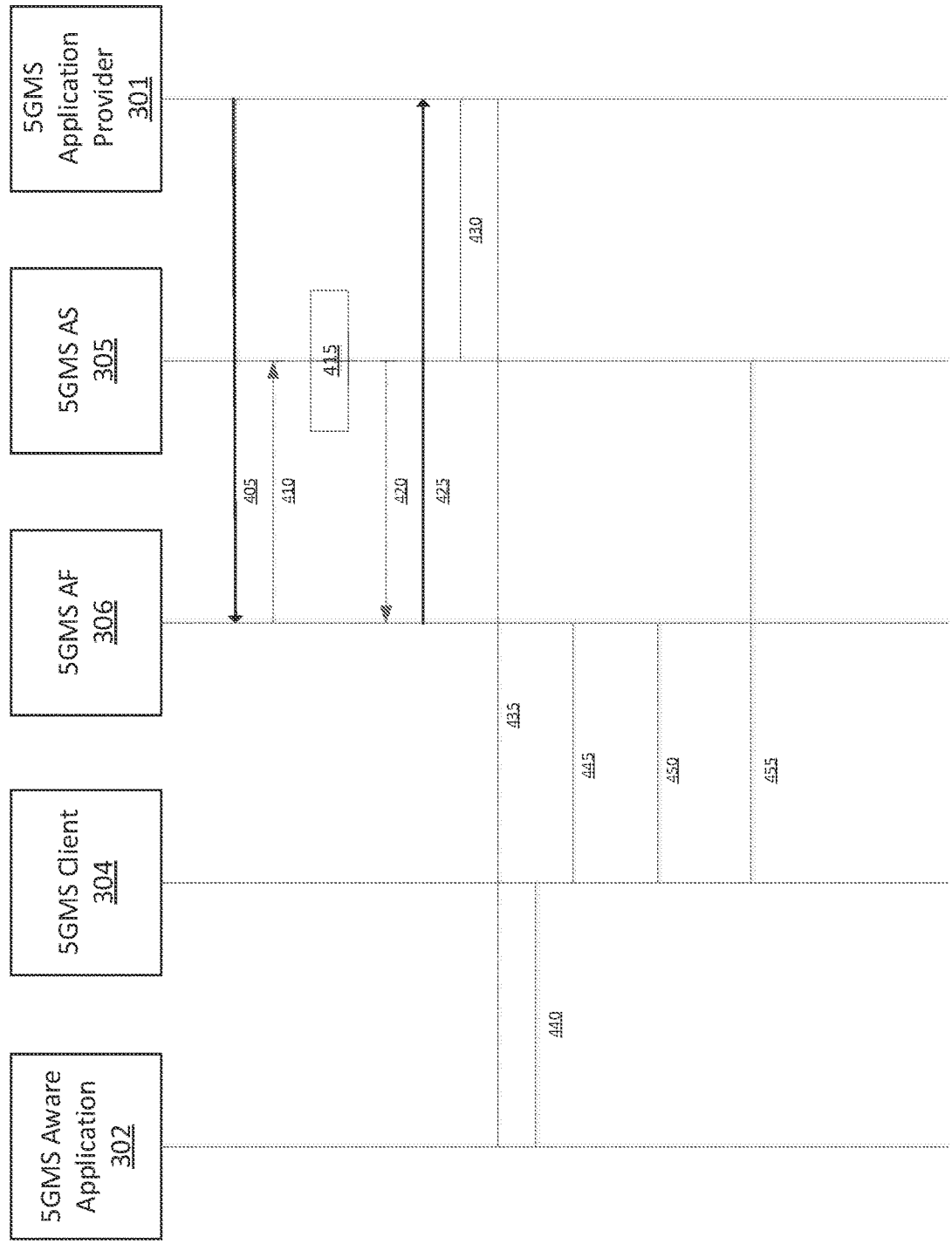
FIG. 4 is a block diagram illustrating an example process for content preparation directed by an application provider, according to embodiments.

FIG. 4 illustrates a process 400 which may relate to a call flow for content preparation as directed by a 5GMS Application Provider before Downlink streaming of content to a 5G Aware Application on a client UE. The process 400 may be performed using architecture 300 or any other architecture desired.

According to process 400, at operation 405, the 5GMS Application Provider 301 may initiate or establish a provisioning session with a 5GMS Application Function 306 using link M1. In some embodiments, at operation 405, the 5GMS Application Provider 301 may create content preparation templates and transmit the content preparation templates to the 5GMS Application Function 306 using link M1. In some embodiments, at operation 405, the 5GMS Application Provider 301 may request the 5GMS Application Function 306 for creation of one or more content preparation templates that define the instructions for content preparation and for content output format using link M1. At operations 410 and 420, the 5GMS Application Function 306 and 5GMS Application Server 305 may communicate with each other and the 5GMS Application Function 306 may request the 5GMS Application Server 305 to discover resources, and allocate content preparation resources and content distribution resources based on the content preparation template using link M3. The 5GMS Application Server 305, at operation 415, may instantiate content preparation process if the content preparation process was not instantiated before. Thus, the 5GMS Application Server 305 may instantiate and perform content preparation processes at the time of request or right before Downlink streaming, i.e., just-in-time. This just-in-time processing increases the 5G network's computational efficiency because no computation is done before it is needed. At operation 425, the 5GMS Application Function 306 may transmit an acknowledgement to the 5GMS Application provider 301 indicating the successful creation of content preparation template, containing information related to content preparation resources, or containing information related to content distribution resources. At operation 430, the 5GMS Application Provider 301 provides the media content to be partially modified to the 5GMS Application Server 305 using link M2.

At operation 435, there may be service announcements or communications between the devices and components of the 5G network. In some embodiments, at operation 435, the 5GMS Aware Application 302 may request service start from the 5GMS Application Provider 301 using link M8. At operation 440, the 5GMS Aware Application 302 and the 5GMS Client 304 may communicate via UE APIs using one of links M7 or M8. At operation 445, the 5GMS client 304 may request service access from or provide service access to the 5GMS Application Function 306. At operation 450, the 5GMS Client 304 may request media session handling with the 5GMS Application Function 306 using link M5. At operation 455, the 5GMS Application Server 305 transmits media stream to the 5GMS Client 304 using M4.

Figure 5:
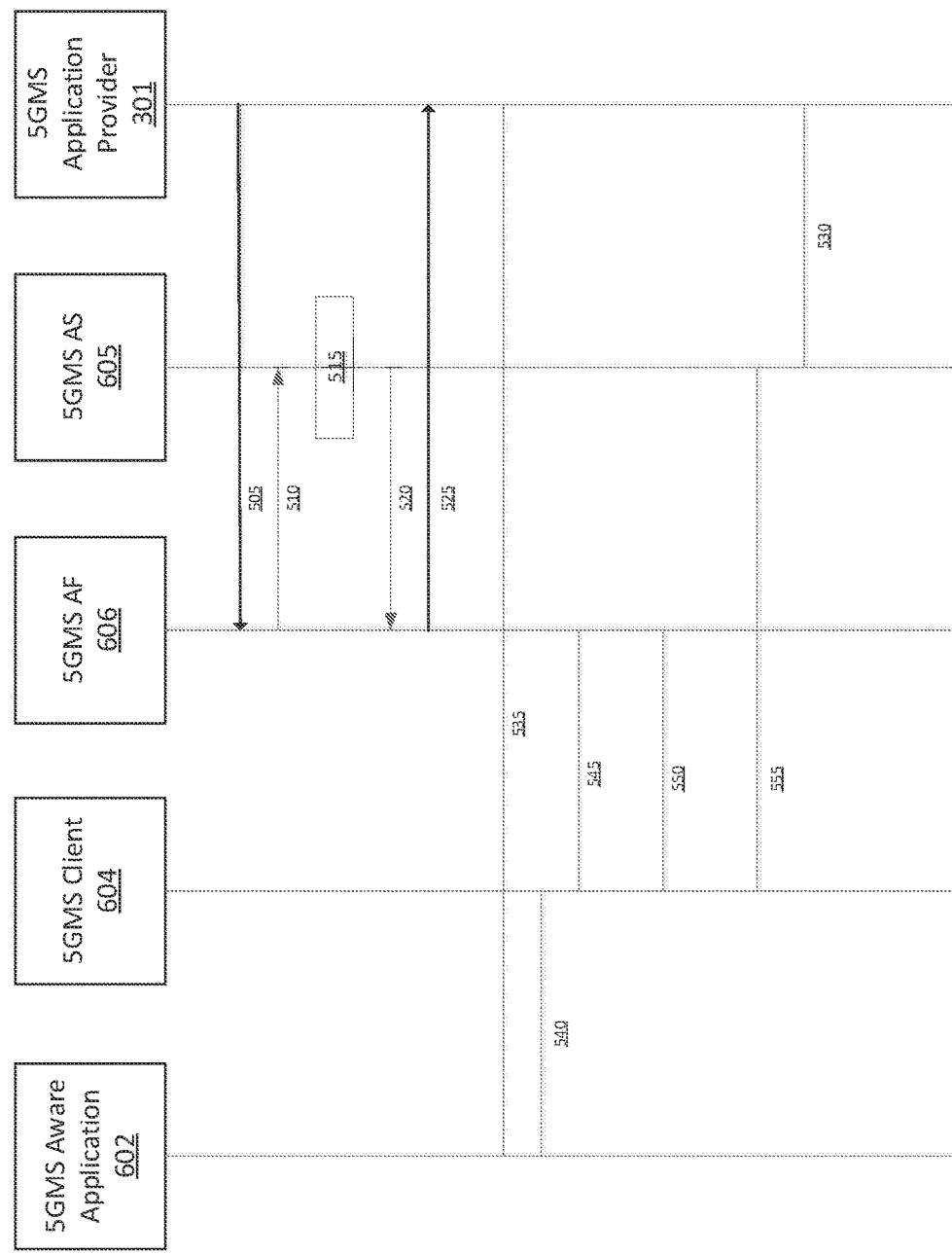
FIG. 5 is a block diagram illustrating an example process for content preparation directed by an application provider, according to embodiments.

FIG. 5 illustrates a process 500 which may relate to a call flow for content preparation as directed by a 5GMS Application Provider before Uplink streaming of content to the 5GMS Application Provider from a 5G Aware Application on a client UE. The process 500 may be performed using architecture 300 or any other architecture desired According to process 500, at operation 505, the 5GMS Application Provider 301 may initiate or establish a provisioning session with a 5GMS Application Function 606 using link M1. In some embodiments, at operation 505, the 5GMS Application Provider 301 may create content preparation templates and transmit the content preparation templates to the 5GMS Application Function 606 using link M1. In some embodiments, at operation 505, the 5GMS Application Provider 301 may request the 5GMS Application Function 606 for creation of one or more content preparation templates that define the instructions for content preparation and for content output format using link M1. At operations 510 and 520, the 5GMS Application Function 606 and 5GMS Application Server 605 may communicate with each other and the 5GMS Application Function 606 may request the 5GMS Application Server 605 to discover resources, and allocate content preparation resources and content distribution resources based on the content preparation template using link M3. The 5GMS Application Server 605, at operation 515, may instantiate content preparation process if the content preparation process was not instantiated before. At operation 525, the 5GMS Application Function 306 may transmit an acknowledgement to the 5GMS Application provider 301 indicating the successful creation of content preparation template, containing information related to content preparation resources, or containing information related to content distribution resources.

At operation 535, there may be service announcements or communications between the devices and components of the 5G network. In some embodiments, at operation 535, the 5GMS Application Provider 301 may broadcast available services to one or more 5GMS Aware Application 602 using link M8. At operation 540, the 5GMS Aware Application 602 and the 5GMS Client 604 may communicate via UE APIs using one of links M7 or M8. At operation 545, the 5GMS client 604 may request service access from or provide service access to the 5GMS Application Function 606. At operation 550, the 5GMS Client 604 may request media session handling with the 5GMS Application Function 606 using link M5. At operation 555, the 5GMS Application Server 605 receives media stream from the 5GMS Client 604 using M4. At operation 530, the 5GMS Application Provider 301 receives the media content to be partially modified to the 5GMS Application Server 305 using link M2.

Figure 6:
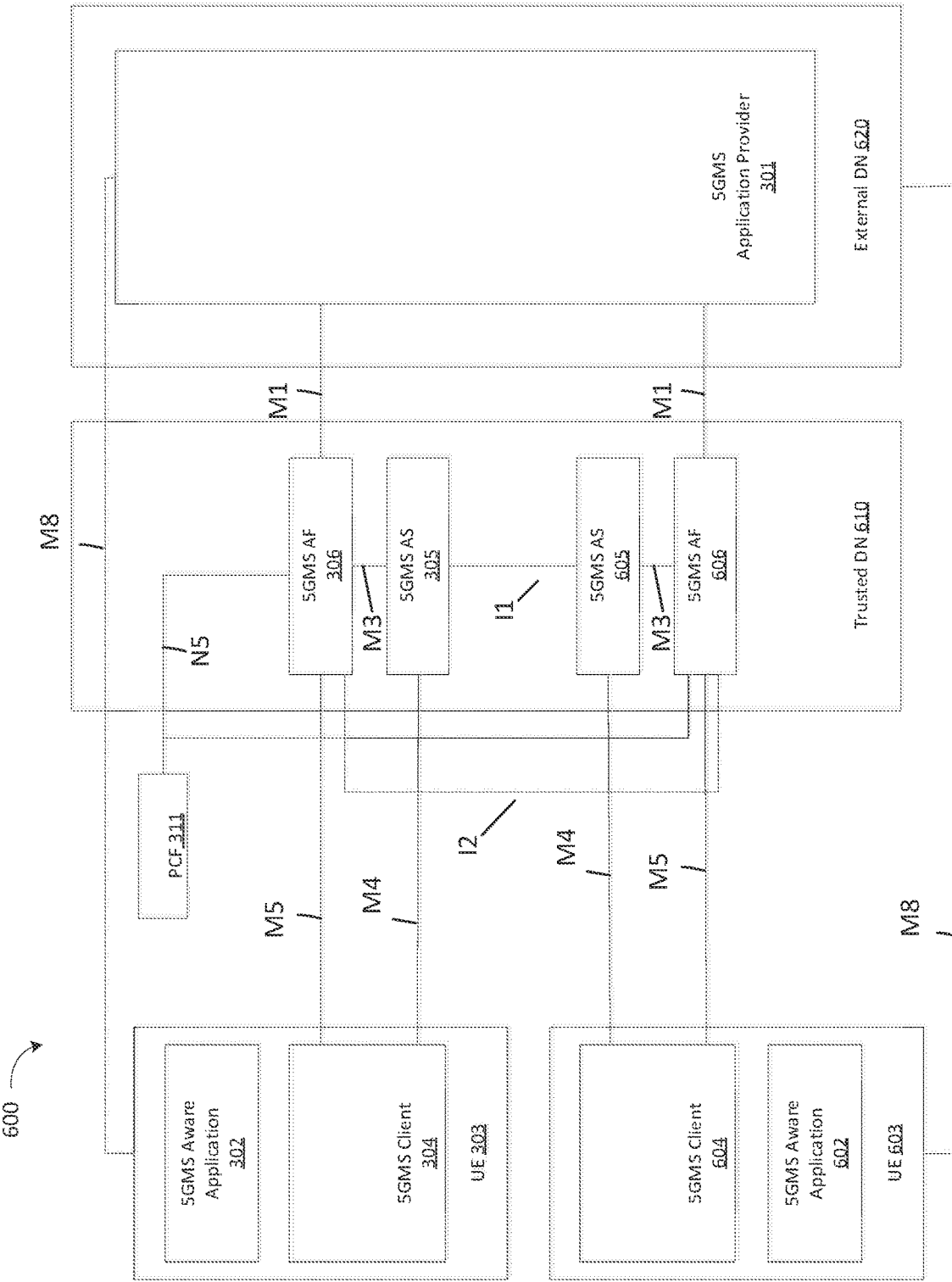
FIG. 6 is a block diagram of a network architecture for media streaming, according to embodiments.

FIG. 6 is a diagram of media architecture 600 for media streaming. In embodiments, media architecture 600 may be used for processing media content requested by a 5GMS Application Provider for an Uplink resource stream from one or more UEs and before Downlink streaming to one or more other UEs. A 5G media streaming uplink (5GMS) Application Provider 301 may use 5GMS for streaming services. 5GMS Application provider 301 may provide a 5GMS Aware Application 302 on the UE 303 to make use of 5GMS Client 304 and network functions using interfaces and APIs defined in 5GMS. In some embodiments, the 5GMS Application provider 301 may also provide a 5GMS Aware Application 602 on the UE 603 to make use of 5GMS Client 604 and network functions using interfaces and APIs defined in 5GMS. 5GMS Application Server (Application Server) may be an Application Server dedicated to 5G Media Streaming. 5GMS Client 304 may be a UE 303 internal function dedicated to 5G Media Streaming. In some embodiments, 5GMS Client 604 may be a UE 603 internal function dedicated to 5G Media Streaming.

5GMS Application Function 606 and 5GMS Application Server 605 may be Data Network (DN) 610 functions. Functions in trusted Data Networks 610 may be trusted by the operator's network. Therefore, Application Functions in trusted Data Networks may directly communicate with all 5G Core functions. Functions in external Data Networks may only communicate with 5G Core functions via the Network Exposure Function (NEF).

The media architecture 600 may connect UE 603 internal functions and related network functions for 5G Media Uplink Streaming. In some embodiments, the media architecture 600 may connect UE 603 internal functions and related network functions for 5G Media Downlink Streaming. Accordingly, media architecture 600 may include a number of functions. For example, 5GMS Client 604 on UE 603 may be an originator of 5GMS service that may be accessed through interfaces/APIs. 5GMS Aware Application 602 may control 5GMS Client 603 by implementing external application or content service provider specific logic and enabling the establishment of a media session. 5GMS Application Server 605 may host 5G media functions. 5GMS Application Provider 301 may be an external application or content specific media functionality, e.g., media storage, consumption, transcoding and redistribution that uses 5GMS to stream media from 5GMS Aware Application 602.

Media architecture 600 may include a number of different interfaces. For example, link M1 may be a 5GMS Provisioning API exposed by 5GMS Application Function 306/606 to provision usage of media architecture 600 and to obtain feedback. Link M2 may be a 5GMS Publish API exposed by 5GMS Application Server 305/605 and used when 5GMS Application Server 305/605 in trusted Data Network, such as Data Network 610, is selected to receive content for streaming service. Link M3 may be an internal API used to exchange information for content hosting on 5GMS Application Server 305/605 between 5GMS Application Server 305/605 and 5GMS Application Function 306/606 within a trusted Data Network such as Data Network 610.

Link M4 may be a Media Uplink or Downlink Streaming API exposed by 5GMS Application Server 305/605 to 5GMS Client 304/604 to stream media content. Link M5 may be a Media Session Handling API exposed by 5GMS Application Function 306/606 to 5GMS Client 304/604 for media session handling, control and assistance that also include appropriate security mechanisms e.g. authorization and authentication. Link M8 may be an Application API which is used for information exchange between 5GMS Aware Application 302/602 and 5GMS Application Provider 301, for example to provide service access information to the 5GMS Aware Application 302/602. Link 12 may be an Internal API exposed by 5GMS Application Server 305/605 to other 5GMS Application Server 605/305 and used for communication with a trusted Data Network such as Data Network 610. Link I1 may be an Internal API exposed by 5GMS Application Function 306/606 to other 5GMS Application Function 606/306 used for communication with a trusted Data Network such as Data Network 610. Link N5 may be an internal interface that may be used to map application specific instructions from one format to another.

Figure 7:
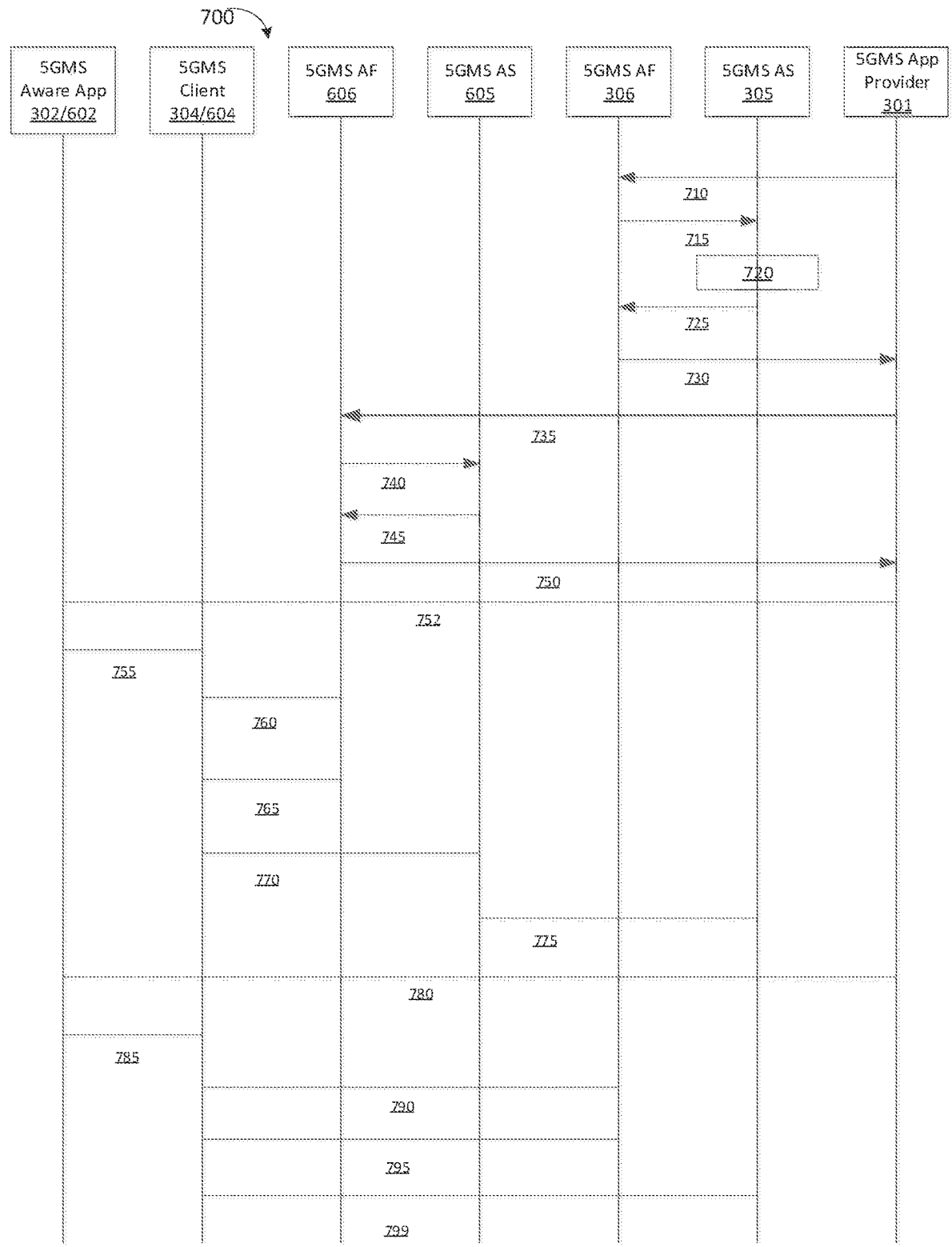
FIG. 7 is a block diagram illustrating an example process for content preparation directed by an application provider, according to embodiments.

FIG. 7 illustrates a process 700 which may relate to a call flow for content preparation as directed by a 5GMS Application Provider requesting content preparation after Uplink streaming from a 5G Aware Application on a 5GMS UE but before Downlink streaming of the media content to a 5G Aware Application on a client UE. The process 700 may be performed using architecture 300 or any other architecture desired.

According to process 700, at operation 710, the 5GMS Application Provider 301 may initiate or establish a provisioning session with a 5GMS Application Function 306 using link M1. In some embodiments, at operation 710, the 5GMS Application Provider 301 may create content preparation templates and transmit the content preparation templates to the 5GMS Application Function 306 using link M1. In some embodiments, at operation 710, the 5GMS Application Provider 301 may request the 5GMS Application Function 306 for creation of one or more content preparation templates that define the instructions for content preparation and for content output format using link M1. At operations 715 and 725, the 5GMS Application Function 306 and 5GMS Application Server 305 may communicate with each other and the 5GMS Application Function 306 may request the 5GMS Application Server 305 to discover resources, and allocate content preparation resources and content distribution resources based on the content preparation template using link M3. The 5GMS Application Server 305, at operation 720, may instantiate content preparation process if the content preparation process was not instantiated before. Thus, the 5GMS Application Server 305 may instantiate and perform content preparation processes at the time of request or right before Downlink streaming, i.e., just-in-time. This just-in-time processing increases the 5G network's computational efficiency because no computation is done before it is needed. At operation 730, the 5GMS Application Function 306 may transmit an acknowledgement to the 5GMS Application provider 301 indicating the successful creation of content preparation template, containing information related to content preparation resources, or containing information related to content distribution resources.

At operation 735, the 5GMS Application Provider 301 may create content preparation templates and transmit the content preparation templates to the 5GMS Application Function 606 using link M1. In some embodiments, at operation 735, the 5GMS Application Provider 301 may request the 5GMS Application Function 606 for creation of one or more content preparation templates that define the instructions for content preparation and for content output format using link M1. At operations 740 and 745, the 5GMS Application Function 606 and 5GMS Application Server 605 may communicate with each other and the 5GMS Application Function 606 may request the 5GMS Application Server 605 to discover resources, and allocate content preparation resources and content distribution resources based on the content preparation template using link M3. At operation 750, the 5GMS Application Function 606 may transmit an acknowledgement to the 5GMS Application provider 301 indicating the successful creation of content preparation template, containing information related to content preparation resources, or containing information related to content distribution resources. At operation 752, the 5GMS Application Provider 301 may broadcast availability of content preparation services to one or more 5GMS Aware Applications on the 5G network.

At operation 755, the 5GMS Aware Application 302 and the 5GMS Client 604 may communicate via UE APIs using one of links M7 or M8. At operation 760, the 5GMS client 604 may request service access from or provide service access to the 5GMS Application Function 606. At operation 765, the 5GMS Client 604 may request media session handling with the 5GMS Application Function using link M5. At operation 770, the 5GMS Application Server 605 receives Uplink media stream from the 5GMS Client 604 using M4. At operation 775, the 5GMS Application Server 305 and 5GMS Application Server 605 may communicate with each other using an internal API using link 12. In some embodiments, at operation 775, the Downlink 5GMS Application Server 305 and Uplink 5GMS Application Server 605 may transfer or stream media content that may be requested by the 5GMS Aware Application 302 or may be modified by the Downlink 5GMS Application Server 305 using the content preparation templates.

At operation 780, the 5GMS Application Provider 301 may announce the commencement of the Downlink media stream to the 5GMS Aware Application 302. At operation 785, the 5GMS Aware Application 302 and the 5GMS Client 304 may communicate via UE APIs using one of links M7 or M8. At operation 790, the 5GMS client 304 may request service access from or provide service access to the 5GMS Application Function 306. At operation 795, the 5GMS Client 304 may request media session handling with the 5GMS Application Function using link M5. At operation 799, the 5GMS Application Server 305 receives Uplink media stream from the 5GMS Client 304 using M4.

In some embodiments, the 5GMS Application Provider may establish a provisioning session with a first 5GMS Application Function, and that first 5GMS Application Function may communicate with one or more other 5GMS Application Functions and may establish a second provisioning session between the first 5GMS Application Function and other 5GMS Application Functions.

In some embodiments, the 5GMS Application Provider may establish a provisioning session with an Uplink 5GMS Application Function, and that Uplink 5GMS Application Function may communicate with one or more Downlink 5GMS Application Functions. The Uplink 5GMS Application Function may establish a second provisioning session with the Downlink 5GMS Application Functions. Thus, eliminating the need for the 5GMS Application Provider 301 to establish a second provisioning session with the Downlink 5GMS Application Function.

In some embodiments, the 5GMS Application Provider may establish a provisioning session with an Downlink 5GMS Application Function, and that Downlink 5GMS Application Function may communicate with one or more Uplink 5GMS Application Functions. The Downlink 5GMS Application Function may establish a second provisioning session with the Uplink 5GMS Application Functions. Thus, eliminating the need for the 5GMS Application Provider 301 to establish a second provisioning session with the Uplink 5GMS Application Function.

Figure 8:
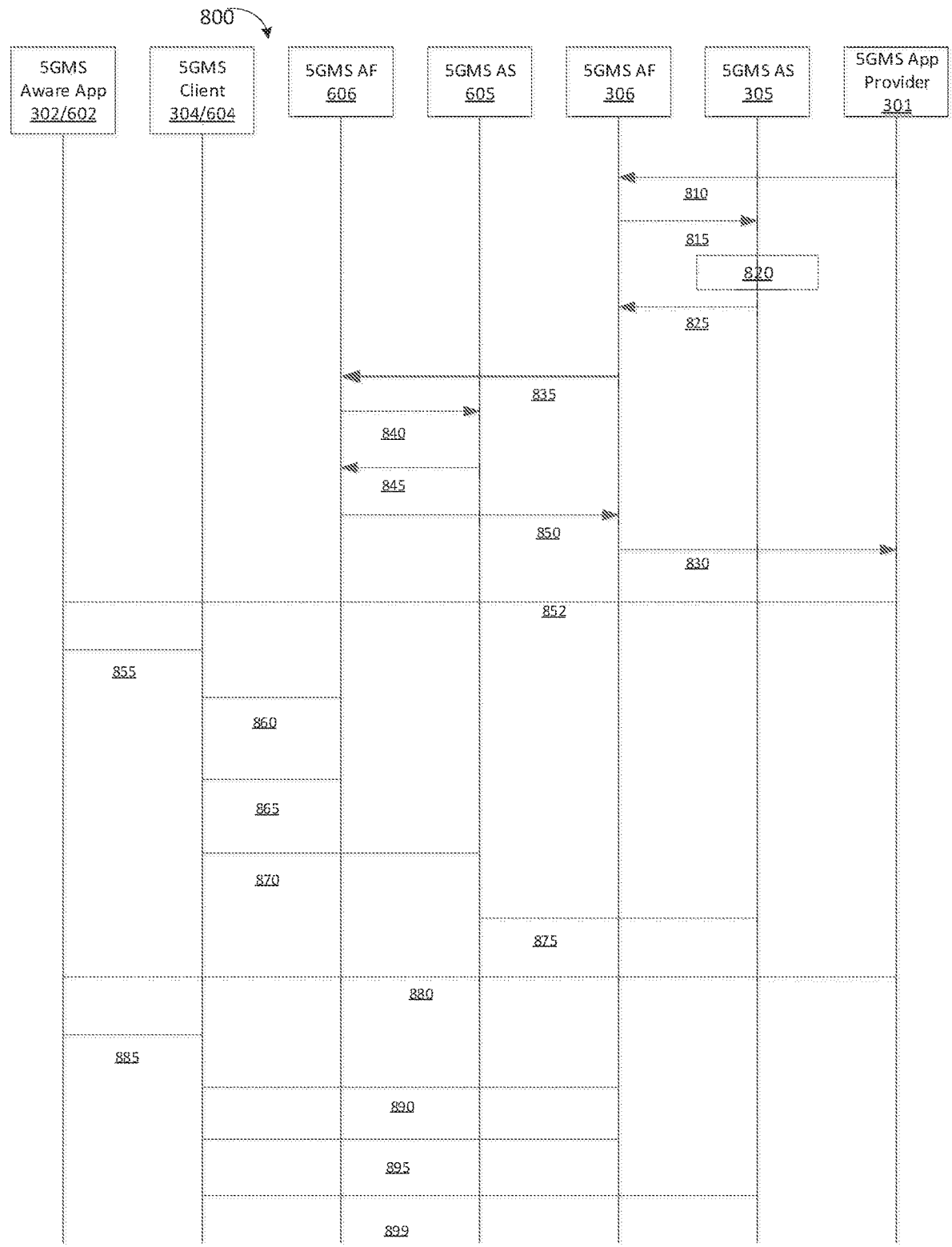
FIG. 8 is a block diagram illustrating an example process for content preparation directed by an application provider, according to embodiments.

As an example, FIG. 8 illustrates a process 800 which may relate to a call flow for content preparation as directed by a 5GMS Application Provider requesting content preparation after Uplink streaming from a 5G Aware Application on a 5GMS UE but before Downlink streaming of the media content to a 5G Aware Application on a client UE. The process 800 illustrates a variation of process 700. Operations 852-899 are similar to operations 752-799 in process 700.

In process 800, the 5GMS Application Provider may establish a provisioning session with only the Downlink 5GMS Application Function 306 and the Downlink 5GMS Application Function 306 may establish a provisioning session with Uplink 5GMS Application Function 606.

At operation 810, the 5GMS Application Provider 301 may initiate or establish a provisioning session with Downlink 5GMS Application Function 306 using link M1. In some embodiments, at operation 810, the Downlink 5GMS Application Provider 301 may create content preparation templates and transmit the content preparation templates to the 5GMS Application Function 306 using link M1. In some embodiments, at operation 810, the 5GMS Application Provider 301 may request the Downlink 5GMS Application Function 306 for creation of one or more content preparation templates that define the instructions for content preparation and for content output format using link M1. At operations 815 and 825, the Downlink 5GMS Application Function 306 and Downlink 5GMS Application Server 305 may communicate with each other and the Downlink 5GMS Application Function 306 may request the Downlink 5GMS Application Server 305 to discover resources, and allocate content preparation resources and content distribution resources based on the content preparation template using link M3. The Downlink 5GMS Application Server 305, at operation 820, may instantiate content preparation process if the content preparation process was not instantiated before. Thus, the Downlink 5GMS Application Server 305 may instantiate and perform content preparation processes at the time of request or right before Downlink streaming, i.e., just-in-time. This just-in-time processing increases the 5G network's computational efficiency because no computation is done before it is needed.

At operation 835, the Downlink 5GMS Application Function 306 may request internal provisioning with the Uplink 5GMS Application 606. At operations 840 and 845, the Uplink 5GMS Application Function 606 and Uplink 5GMS Application Server 605 may communicate with each other and the Uplink 5GMS Application Function 606 may request the Uplink 5GMS Application Server 605 to discover resources, and allocate content preparation resources and content distribution resources based on the content preparation template using link M3. At operation 850, the Uplink 5GMS Application Function 606 may transmit an acknowledgement to the Downlink 5GMS Application Function 306 indicating the successful creation of content preparation template, containing information related to content preparation resources, or containing information related to content distribution resources.

At operation 830, the Downlink 5GMS Application Function 306 may transmit an acknowledgement to the 5GMS Application provider 301 indicating successful provisioning with Uplink 5GMS Application Function 306, creation of content preparation template, containing information related to content preparation resources, or containing information related to content distribution resources.

Figure 9:
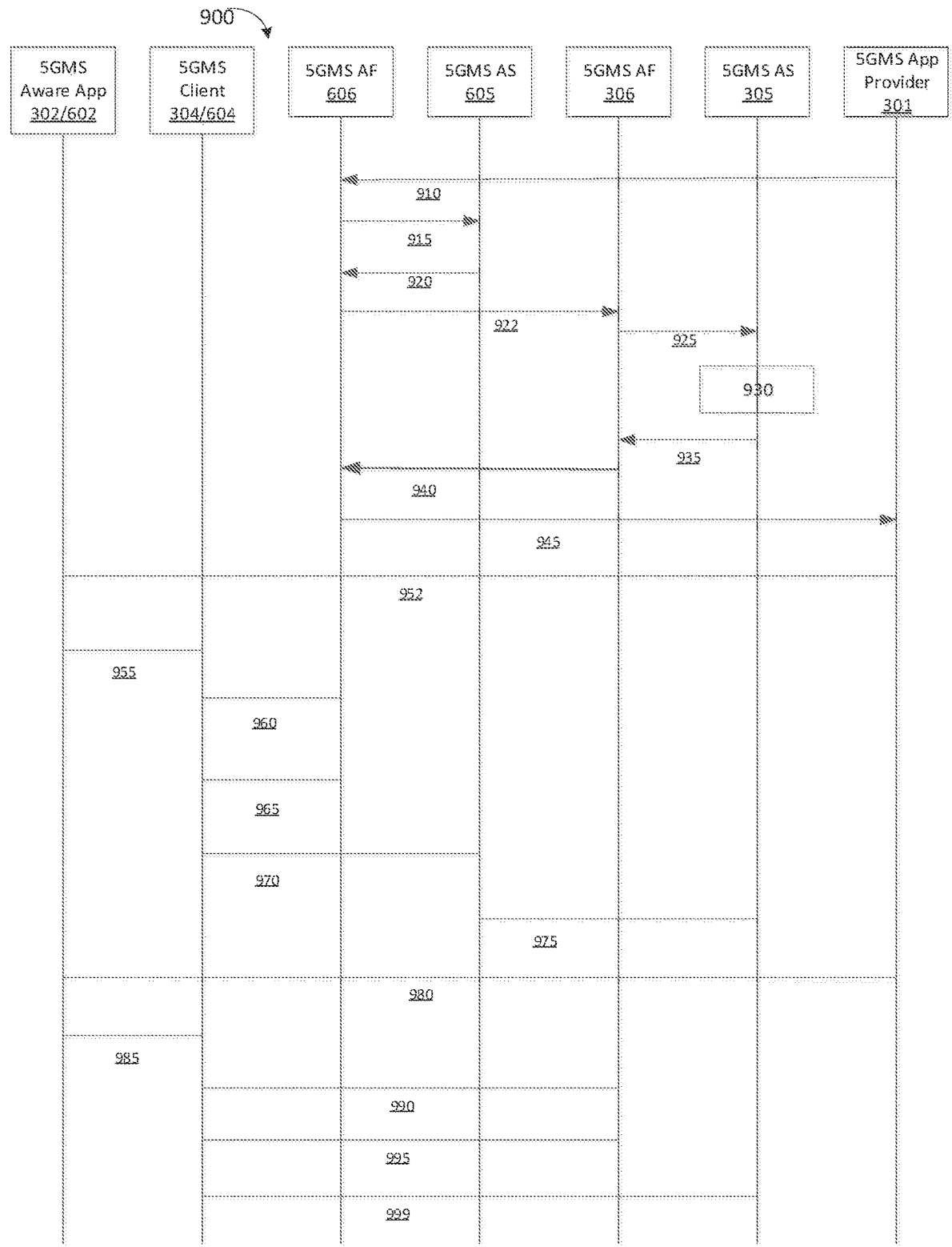
FIG. 9 is a block diagram illustrating an example process for content preparation directed by an application provider, according to embodiments.

FIG. 9 illustrates a process 900 which may relate to a call flow for content preparation as directed by a 5GMS Application Provider requesting content preparation after Uplink streaming from a 5G Aware Application on a 5GMS UE but before Downlink streaming of the media content to a 5G Aware Application on a client UE. The process 900 illustrates a variation of process 700. Operations 952-999 are similar to operations 752-799 in process 700.

In process 900, the 5GMS Application Provider may establish a provisioning session with only the Uplink 5GMS Application Function 606 and the Uplink 5GMS Application Function 606 may establish a provisioning session with Downlink 5GMS Application Function 306.

At operation 910, the 5GMS Application Provider 301 may initiate or establish a provisioning session with Uplink 5GMS Application Function 606 using link M1. In some embodiments, at operation 910, the 5GMS Application Provider 301 may create content preparation templates and transmit the content preparation templates to the Uplink 5GMS Application Function 606 using link M1. In some embodiments, at operation 910, the 5GMS Application Provider 301 may request the Uplink 5GMS Application Function 606 for creation of one or more content preparation templates that define the instructions for content preparation and for content output format using link M1. At operations 915 and 920 the Uplink 5GMS Application Function 606 and Uplink 5GMS Application Server 605 may communicate with each other and the Uplink 5GMS Application Function 606 may request the Uplink 5GMS Application Server 605 to discover resources, and allocate content preparation resources and content distribution resources based on the content preparation template using link M3.

At operation 922, the Uplink 5GMS Application Function 606 may request internal provisioning with the Downlink 5GMS Application Function 306 using link I1. At operations 925 and 935, the Downlink 5GMS Application Function 306 and Downlink 5GMS Application Server 305 may communicate with each other and the Downlink 5GMS Application Function 306 may request the Downlink 5GMS Application Server 305 to discover resources, and allocate content preparation resources and content distribution resources based on the content preparation template using link M3. The Downlink 5GMS Application Server 305, at operation 930, may instantiate content preparation process if the content preparation process was not instantiated before. Thus, the Downlink 5GMS Application Server 305 may instantiate and perform content preparation processes at the time of request or right before Downlink streaming, i.e., just-in-time. This just-in-time processing increases the 5G network's computational efficiency because no computation is done before it is needed.

At operation 940, the Downlink 5GMS Application Function 306 may transmit an acknowledgement to the Uplink 5GMS Application Function 606 indicating the successful creation of content preparation template, containing information related to content preparation resources, or containing information related to content distribution resources At operation 945, the Uplink 5GMS Application Function 606 may transmit an acknowledgement to the Downlink 5GMS Application Function 306 indicating the successful creation of content preparation template, containing information related to content preparation resources, or containing information related to content distribution resources.

Figure 10A:
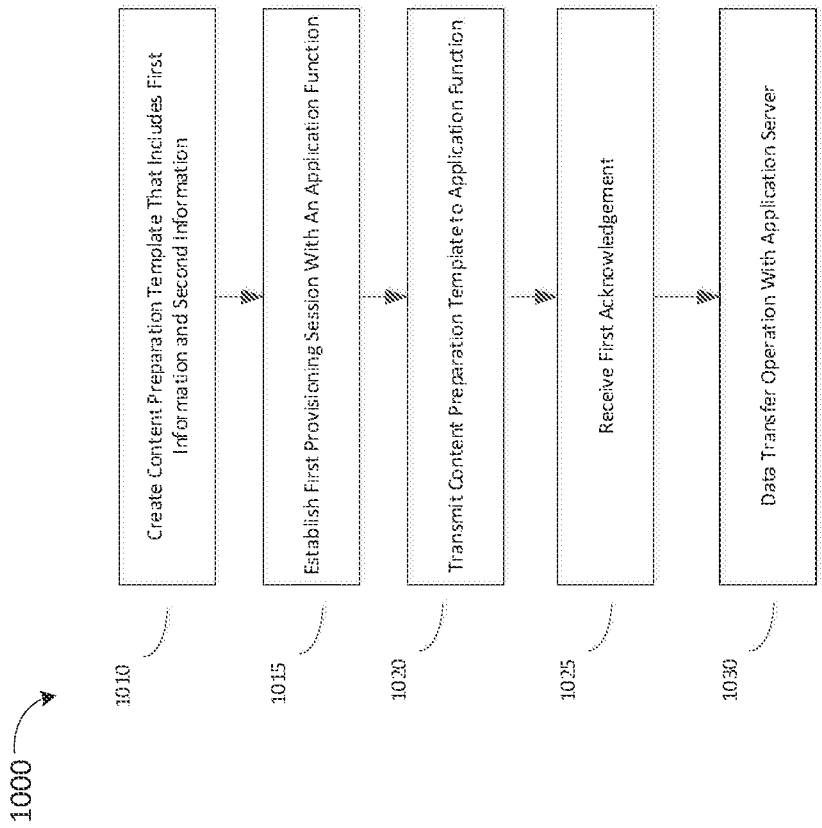
FIG. 10A is a simplified flowchart illustrating an example process for content preparation directed by an application provider, according to embodiments.

FIG. 10A shows an exemplary flowchart illustrating a process 1000 which may relate to a 5GMS Application Provider directing a content preparation process to process media content streamed over a 5G network. At 1010, a 5GMS Application Provider may create content preparation templates that include a first information and a second information. In some embodiments, the first information may include information about content preparation. As an example, the first information may include specific instructions for content preparation. In some embodiments, the second information may include information about content output. As an example, the second information may include instructions specifying the output formats and requirements for the media content. As an example, the 5GMS Application Provider 301 may create preparation templates that include a first information and a second information.

At 1015, the 5GMS Application Provider may establish a first provisioning session with a 5GMS Application Function. As an example, the 5GMS Application Provider 301 may establish a first provisioning session with a 5GMS Application Function 306 using link M1.

At 1020, the 5GMS Application Provider may transmit the content preparation templates to the 5GMS Application Function. As an example, the 5GMS Application Provider 301 may establish a first provisioning session with a 5GMS Application Function 306 using link M1 and transmit the content preparation templates using link M1. In some embodiments, the transmitting of the content preparation templates to the 5GMS Application Function may cause an instantiation of a content preparation and resource allocation process at an application server. As an example, the 5GMS Application Provider 301 may establish a first provisioning session with a 5GMS Application Function 306 using link M1 and transmit the content preparation templates using link M1. This may cause the 5GMS Application Function 306 to instantiate a content preparation and resource allocation process at the 5GMS Application Server 305 using Link M3. Upon completion of the content preparation and resource allocation process at the 5GMS Application Server 305, the 5GMS Application Server 305 may communicate with the 5GMS Application Function 306 and indicate the allocation of at least one of content preparation resources and content distribution resources.

At 1025, the 5GMS Application Provider may receive a first acknowledgement from the 5GMS Application Function that includes an indication of an allocation of at least one of content preparation resources and content distribution resources. As an example, the 5GMS Application Function 306 may transmit a first acknowledgement to the 5GMS Application provider 301 indicating the successful creation of content preparation template, containing information related to content preparation resources, or containing information related to content distribution resources. In some embodiments, the first acknowledgement may also include information indicating at least one of an uplink session or a downlink session with a second application function.

At 1030, the 5GMS Application Provider may perform a data transfer operation with the 5GMS Application Server.

In some embodiments, the 5GMS Application Provider may transmit content to an 5GMS Application Server, wherein the transmitting of the content is done prior to downlink streaming of the content to be partially modified to one or more user devices. Further, the 5GMS Application Provider may direct the 5GMS Application Server (in some embodiments, via the 5GMS Application Function) to partially or completely modify the content based on the content preparation template and distribute the partially or completely modified content to the one or more client devices that have requested the modified content.

As an example, the 5GMS Application Provider 301 may transmit media content to a 5GMS Application Server 305, wherein the media content may be modified based on the content preparation template. As an example, in some embodiments, the media content to be transmitted may be partially or completely modified prior to the downlink streaming of the modified media content to one or more user devices, 5GMS client 304 or 5GMS Aware Application 302. The 5GMS Application Provider 301 may transmit media content to be partially modified to the 5GMS Application Server 305. In some embodiments, the 5GMS Application Provider 305 may transform the media content or partially modify the media content based on the content preparation template and distribute the partially modified media content to the one or more requesting user devices, 5GMS client 304 or 5GMS Aware Application 302.

In some embodiments, a 5GMS Application Provider may receive partially modified content from a 5GMS Application Server, wherein the partially modified media content is received after uplink streaming of content from one or more user devices. In some embodiments, the partially or completely modified media content may be received by the 5GMS Application Provider after the uplink streaming of the media content from one or more user devices to a 5GMS Application Server. The 5GMS Application Server may partially or completely modify the media content received from the one or more user devices based on the content preparation template and transmit the partially or completely modified media content to the 5GMS Application Provider that requested the partially or completely modified media content.

In some embodiments, a 5GMS Application Provider may direct the transfer of media content from a first 5GMS Application Server to another 5GMS Application Server through information in or accompanying the content preparation template. The 5GMS Application Provider may direct the transfer of media content from a first 5GMS Application Server to another 5GMS Application Server through information in or accompanying the content preparation template using one or more 5GMS Application Functions, wherein either the first 5GMS Application Server or the second 5GMS Application Server may be directed to modify the media content based on the content preparation template.

Figure 10B:
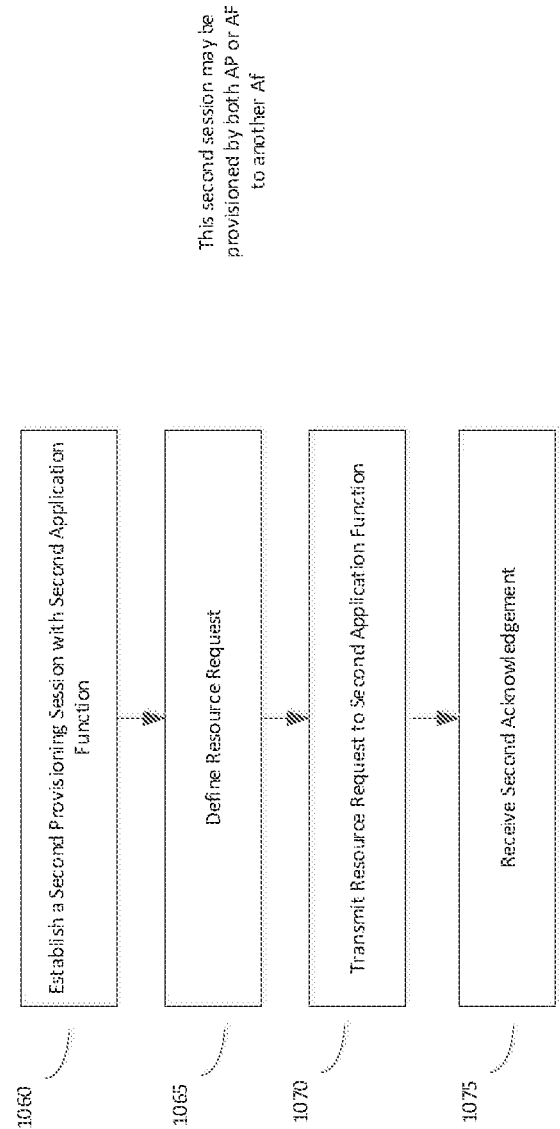
FIG. 10B is a simplified flowchart illustrating an example process for content preparation directed by an application provider, according to embodiments.

FIG. 10B shows an exemplary flowchart illustrating a process 1050 which may relate to a 5GMS Application Provider directing a content preparation process to process media content streamed over a 5G network. In some embodiments, process 1050 may relate to a 5GMS Application Provider establishing a second provisioning session with a second 5GMS Application Function. In some embodiments, the establishment of the second provisioning session may be initiated by the 5GMS Application Provider to modify or process media content after media content was uploaded by an Uplink 5GMS Aware Application associated with an Uplink 5GMS Client but before the media content is downloaded by a Downlink 5GMS Aware Application associated with an Downlink 5GMS Client. As an example, a 5GMS Application Provider 301 may provision a second session with another 5GMS Application Function 606 when processing media content after a 5GMS Aware Application 602 associated with a 5GMS Client 604 uploads the media content to the 5G network but before a 5GMS Aware Application 302 associated with a 5GMS Client 304 downloads the media content.

At 1060, a 5GMS Application Provider may establish a second provisioning session with a second 5GMS Application Function. As an example, the 5GMS Application Provider 301 may establish a second provisioning session with a second 5GMS Application Function 606. In some embodiments, the 5GMS Application Provider may direct a first 5GMS Application Function to establish a second provisioning session with a second 5GMS Application Function. As an example, the 5GMS Application Provider 301 may establish a first provisioning session with 5GMS Application Function 306, and then may direct or configure 5GMS Application Function 306 to establish a second provisioning session with a second 5GMS Application Function 606. As another example, the 5GMS Application Provider 301 may establish a first provisioning session with 5GMS Application Function 606, and then may direct or configure 5GMS Application Function 606 to establish a second provisioning session with a second 5GMS Application Function 306. In some embodiments, the 5GMS Application Provider may direct a first 5GMS Application Function to establish a second provisioning session with a second 5GMS Application Function prior to receiving the first acknowledgement.

At 1065, the 5GMS Application Provider may define a resource request based on the allocation of at least one of the content preparation resources and the content distribution resources. As an example, the 5GMS Application Provider 301 may define resource request based on the allocation of at least one of the content preparation resources and the content distribution resources as indicated by the first acknowledgement.

At 1070, the 5GMS Application Provider may transmit the resource request to the second the 5GMS Application Function. As an example, the 5GMS Application Provider 301 may transmit the resource request to the second 5GMS Application Function 606.

At 1075, the 5GMS Application Provider may receive a second acknowledgement from the second 5GMS Application Function that includes an indication of the allocation of the content preparation resources and the content distribution resources based on the resource request. As an example, the 5GMS Application Provider 301 may receive a second acknowledgement from the second 5GMS Application Function 606 that indicates the allocation of the content preparation resources and the content distribution resources based on the resource request by 5GMS Application Provider 301.

Although FIGS. 4-5 and 7-10B show example operations of the processes 400, 500, 700, 800, 900, 1000, and 1050 in embodiments. The processes 400, 500, 700, 800, 900, 1000, and 1050 may include additional operations, fewer operations, different operations, or differently arranged operations than those depicted in FIGS. 4-5 and 7-10B. In embodiments, any operations of processes 400, 500, 700, 800, 900, 1000, and 1050 may be combined or arranged in any amount or order, as desired. In embodiments, two or more of the operations of the processes 400, 500, 700, 800, 900, 1000, and 1050 may be performed in parallel. The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

What is claimed is:

1. A method of directing content preparation for a 5G media streaming (5GMS) network performed by at least one processor implementing a 5GMS application provider, the method comprising:
   creating a content preparation template, by the 5GMS application provider, wherein the content preparation template includes first information specifying instructions for content preparation, and second information specifying instructions for content output;
   establishing a first provisioning session with a 5GMS application function;
   transmitting the content preparation template to the 5GMS application function in the first provisioning session, wherein the 5GMS application function requests to allocate 5GMS content preparation resources and 5GMS content distribution resources;
   receiving a first acknowledgement from the 5GMS application function, wherein the first acknowledgement indicates an allocation of at least one of content preparation resources and content distribution resources; and
   receiving partially modified content from a 5GMS application server, wherein the partially modified content is received after uplink streaming of content from one or more user devices.

2. The method of claim 1, further comprising:
   transmitting content to a 5GMS application server, wherein the transmitting of the content is done prior to downlink streaming of the content to one or more user devices, and wherein the transmitting of the content to the 5GMS application server is subsequent to establishing the first provisioning session.

3. The method of claim 2, wherein the 5GMS application server is configured to partially modify the content based on the content preparation template, and wherein the 5GMS application server is configured to distribute the partially modified content to the one or more user devices.

4. The method of claim 1, wherein the 5GMS application server is configured to partially modify the content from the one or more user devices based on the content preparation template, and wherein the 5GMS application server is configured to receive the content to be partially modified from the one or more user devices.

5. The method of claim 1, wherein the 5GMS application function comprises a first 5GMS application function, and wherein the method further comprises:
- establishing a second provisioning session with a second 5GMS application function;
- defining a resource request, wherein the resource request is based on the allocation of the at least one of the 5GMS content preparation resources and the 5GMS content distribution resources;
- transmitting the resource request to the second 5GMS application function in the second provisioning session, wherein the second 5GMS application function requests to allocate 5GMS content preparation resources and 5GMS content distribution resources; and
- receiving a second acknowledgement from the second 5GMS application function, wherein the second acknowledgement indicates the allocation of the 5GMS content preparation resources and the 5GMS content distribution resources based on the resource request.

6. The method of claim 1, wherein the 5GMS application function is a first 5GMS application function, and wherein the first acknowledgement further comprises information indicating at least one of an uplink session or a downlink session with a second 5GMS application function.

7. The method of claim 1, wherein the transmitting of the content preparation template to the application function causes an instantiation of a content preparation and resource allocation process at a 5GMS application server.

8. The method of claim 1, wherein the 5GMS application function comprises a first 5GMS application function, and wherein prior to the receiving of the first acknowledgement, the first 5GMS application function is configured to establish a second provisioning session with a second 5GMS application function.

9. A device for directing content preparation for a 5G media streaming (5GMS) network, the device comprising:
- at least one memory configured to store program code; and
- at least one processor implementing a 5GMS application provider configured to read the program code and operate as instructed by the program code, the program code including:
  - first creating code configured to cause the at least one processor to create a content preparation template, wherein the content preparation template includes first information specifying instructions for content preparation, and second information specifying instructions for content output;
  - first establishing code configured to cause the at least one processor to establish a first provisioning session with a 5GMS application function;
  - first transmitting code configured to cause the at least one processor to transmit the content preparation template to the 5GMS application function in the first provisioning session, wherein the 5GMS application function requests to allocate 5GMS content preparation resources and 5GMS content distribution resources;
  - first receiving code configured to cause the at least one processor to receive a first acknowledgement from the 5GMS application function, wherein the first acknowledgement indicates an allocation of at least one of 5GMS content preparation resources and 5GMS content distribution resources; and
  - second receiving code configured to cause the at least one processor to receive partially modified content from a 5GMS application server, wherein the partially modified content is received after uplink streaming of content from one or more user devices.

10. The device of claim 9, further comprising, second transmitting code configured to cause the at least one processor to transmit content to a 5GMS application server, wherein the transmitting of the content is done prior to downlink streaming of the content to one or more user devices, and wherein the transmitting of the content to the 5GMS application server is subsequent to establishing the first provisioning session.

11. The device of claim 10, wherein the 5GMS application server is configured to partially modify the content based on the content preparation template, and wherein the 5GMS application server is configured to distribute the partially modified content to the one or more user devices.

12. The device of claim 9, wherein the 5GMS application server is configured to partially modify the content from the one or more user devices based on the content preparation template, and wherein the 5GMS application server is configured to receive the content to be partially modified from the one or more user devices.

13. The device of claim 9, wherein the transmitting of the content preparation template to the 5GMS application function causes an instantiation of a content preparation and resource allocation process at a 5GMS application server.

14. The device of claim 9, wherein the 5GMS application function comprises a first 5GMS application function, and wherein prior to the receiving of the first acknowledgement, the first 5GMS application function is configured to establish a second provisioning session with a second 5GMS application function.

15. The device of claim 9, wherein the 5GMS application function comprises a first 5GMS application function, further comprising:
- second establishing code configured to cause the at least one processor to establish a second provisioning session with a second 5GMS application function;
- first defining code configured to cause the at least one processor to define a resource request, wherein the resource request is based on the allocation of the at least one of the 5GMS content preparation resources and the 5GMS content distribution resources;
- second transmitting code configured to cause the at least one processor to transmit the resource request to the second 5GMS application function; and
- second receiving code configured to cause the at least one processor to receive a second acknowledgement from the second 5GMS application function, wherein the second acknowledgement indicates the allocation of the 5GMS content preparation resources and the 5GMS content distribution resources based on the resource request.

16. The device of claim 9, wherein the 5GMS application function is a first 5GMS application function, and wherein the first acknowledgement further comprises information indicating at least one of an uplink session or a downlink session with a second 5GMS application function.

17. A non-transitory computer-readable medium storing instructions, the instructions comprising: one or more instructions that, when executed by one or more processors of a device for managing capabilities of a 5G media streaming (5GMS) network, cause the one or more processors to:
create a content preparation template, wherein the content preparation template includes first information specifying instructions for content preparation, and second information specifying instructions for content output;
establish a first provisioning session with a 5GMS application function;
transmit the content preparation template to the 5GMS application function in the first provisioning session, wherein the 5GMS application function requests to allocate 5GMS content preparation resources and 5GMS content distribution resources;
receive a first acknowledgement from the 5GMS application function, wherein the first acknowledgement indicates an allocation of at least one of 5GMS content preparation resources and 5GMS content distribution resources; and
receive partially modified content from a 5GMS application server, wherein the partially modified content is received after uplink streaming of content from one or more user devices.

18. The non-transitory computer-readable medium of claim 17, wherein the application function comprises a first 5GMS application function, and wherein prior to the receiving of the first acknowledgement, the first 5GMS application function is configured to establish a second provisioning session with a second 5GMS application function.

\* \* \* \* \*